United States Patent
Isono (10) Patent No.: US 7,891,212 B2
(45) Date of Patent: *Feb. 22, 2011

(54) MAGNETIC DISK GLASS SUBSTRATE (75) Inventor: Hideki Isono, Tokyo (JP)

(73) Assignee: Hoya Corporation, Tokyo (JP)

( * ) Notice: Subject to any disclaimer, the term of this patent is extended or adjusted under 35 U.S.C. 154(b) by 425 days.

This patent is subject to a terminal disclaimer.

(21) Appl. No.: 10/594,248

(22) PCT Filed: Mar. 24, 2005

(86) PCT No.: PCT/JP2005/005362

§ 371 (c)(1),
(2), (4) Date: Sep. 25, 2006

(87) PCT Pub. No.: WO2005/093720

PCT Pub. Date: Oct. 6, 2005

(65) Prior Publication Data

US 2008/0241603 A1    Oct. 2, 2008

(51) Int. Cl.
C03C 21/00  (2006.01)
C03B 27/00  (2006.01)

(52) U.S. Cl. .......... 65/30.14; 65/60.7; 65/116; 428/846.9

(58) Field of Classification Search ........ 428/64.5, 428/846.9, 846, 848.8; 65/411, 33.5, 146, 65/30.14, 30.1, 30.13, 60.1, 60.7, 111, 116, 65/61; 501/4
See application file for complete search history.

(56) References Cited

U.S. PATENT DOCUMENTS

| | | | | |
|---|---|---|---|---|
| 6,134,918 A | * | 10/2000 | Eto et al. | 65/30.14 |
| 2002/0110706 A1 | * | 8/2002 | Miyamoto | 428/65.3 |
| 2005/0284179 A1 | * | 12/2005 | Isono et al. | 65/30.14 |

FOREIGN PATENT DOCUMENTS

| JP | 2001-167427 A | | 6/2001 |
|---|---|---|---|
| JP | 3254157 B | | 11/2001 |
| JP | 2002220259 | * | 9/2002 |

OTHER PUBLICATIONS

JA 2001220259—Abstract, Translation.*
JA 2001167427—Translation.*
JA 10198942—Translation.*

* cited by examiner

Primary Examiner—Kevin M. Bernatz
Assistant Examiner—Louis Falasco
(74) Attorney, Agent, or Firm—Sughrue Mion, PLLC (57) ABSTRACT

A magnetic disk glass substrate including compressive stress layers at main surfaces and a tensile stress layer between the compressive stress layers formed by chemical strengthening. When the glass substrate has a thickness of less than 0.5 mm and the tensile stress layer has a thickness L and a tensile stress of Pt (kg/mm²), the following relation holds:

$$0.4 \text{ (kg/mm)} \leq L \cdot Pt \leq 2.0 \text{ (kg/mm)}.$$

7 Claims, 3 Drawing Sheets

MAGNETIC DISK GLASS SUBSTRATE

TECHNICAL FIELD

The present invention relates to a magnetic disk glass substrate and a magnetic disk that are used in a hard disk drive (HDD) being a type of magnetic disk device, and methods for manufacturing the magnetic disk glass substrate and the magnetic disk.

BACKGROUND ART

As the information technology is developing, dramatic innovation on information technology, particularly on magnetic recording technology, is desired more and more. In a magnetic disk that is to be installed in a hard disk drive (HDD) being a type of magnetic disk device used as a computer storage, the information recording density is being increased rapidly, unlike in other types of magnetic recording media, such as magnetic tapes and flexible disks. Accordingly, the capacity for storing information in a personal computer is dramatically increasing on the strength of the increase in information recording density of the magnetic disk.

The magnetic disk includes a magnetic layer and other layers on a substrate, such as an aluminum-based alloy substrate or a glass substrate. In a hard disk drive, the magnetic disk is rapidly spun under a flying magnetic head, and the magnetic head records information signals as magnetized patterns on the magnetic layer, or reproduces the recorded information signals.

As the demand (for mobile use) that the hard disk drive is used in portable apparatuses (for example, notebook personal computer devices) increases, attention is directed to glass substrates having high strength, high stiffness, and high impact resistance for the magnetic disk substrate. In addition, the glass substrate can have a smooth surface. Accordingly the glass substrate facilitates the reduction of the flying height of the magnetic head that records and reproduces information while being floating over the magnetic disk. Thus, a magnetic disk having a high information recording density can be achieved.

However, the glass substrate is made of a brittle material. Accordingly, a variety of approaches have been proposed to strengthen the glass substrate. For example, Japanese Patent (JP-B) No. 2657967 (Reference Document 1) has described chemical strengthening treatment in which the glass substrate is immersed in a mixed solution of $KNO_3$ and $NaNO_3$ for a predetermined time to substitute $K^+$ ions for $Li^+$ ions at the surfaces of the glass substrate and thus to form compressive stress layers at both main surfaces and a tensile stress layer between the compressive stress layers. Reference Document 1 has taught that the maximum tensile stress of the tensile stress layer is preferably 4 $kg/mm^2$ or less.

Japanese Patent (JP-B) No. 3254157 (Reference Document 2) has disclosed that when the glass substrate chemically strengthened by the same method as in Reference Document 1 has a thickness of 0.5 to 1.0 mm, the compressive stress layers preferably have a thickness of 80 to 100 μm and a compressive stress of 2 to 15 $kg/mm^2$ with the tensile stress layer having a tensile stress of 1.5 $kg/mm^2$ or less.

The information recording density of the magnetic disk has been increased as high as over 40 gigabits per square inch in recent years. Further, a super high recording density of over 100 gigabits per square inch is about to be realized. The recent magnetic disk exhibiting such a high information recording density can store a practically sufficient amount of information even if it has a much smaller area than known magnetic disks.

The magnetic disk has a much higher information recording and reproduction speed (response speed) than other information recording media, and can accordingly record and reproduce information anytime.

These features of the magnetic disk arouse a demand for such a small hard disk drive as can be installed in portable apparatuses much smaller than personal computers and requiring high response speed, such as cellular phones, digital cameras, portable information apparatuses (for example, PDA's (personal digital assistants)), and car navigation systems. Specifically, highly mobile apparatuses require a small hard disk drive containing a magnetic disk using a substrate having, for example, a diameter of 50 mm or less, or of 30 mm or less, and a thickness of less than 0.5 mm, or of 0.4 mm or less, and such highly mobile apparatuses include portable information apparatuses such as cellular phones, digital cameras, portable MP3 players, and PDA's, and vehicle-mounted apparatuses such as car navigation systems.

The small hard disk drive used in these portable or mobile apparatuses is always exposed to the risk of impact from falling or vibration. Accordingly, the hard disk drive for these applications, including the magnetic disk, requires that each internal member has higher impact resistance so as to enhance the reliability.

The magnetic disk using a glass substrate is useful for hard disk drives used in the portable apparatuses. This is because the hard substrate made of glass has higher stiffness than metals, which are rather soft, and because the strength of the glass substrate can be increased to a desired level by chemical strengthening treatment or the like as described above.

DISCLOSURE OF INVENTION

Problems to be Solved by the Invention

Accordingly, an object of the present invention is to provide a magnetic disk glass substrate suitably used for a small hard disk drive capable of being installed in highly mobile apparatuses, such as cellular phones, digital cameras, portable MP3 players, PDA's and other portable information apparatuses, and car navigation systems and other vehicle-mounted apparatuses.

Another object of the invention is to provide a magnetic disk glass substrate capable of achieving a small hard disk drive that is not broken even if an impact of, for example, 2000 G or more is applied, and that allows the magnetic head to float low, for example, at a flying height of 10 nm or less.

Still another object of the invention is to provide a magnetic disk using the magnetic disk glass substrate.

Means for Solving the Problems

The inventors of the present invention have found a causality between problems in magnetic disks resulting from fractures caused in hard disk drives during the drop test or the like and the manufacture process of magnetic disk glass substrates, particularly a chemical strengthening step, and have conducted intensive research to enhance the impact resistance of the glass substrate.

The inventors found a variety of difficulties in manufacture of a small glass substrate intended for use in small hard disk drives, in comparison with the manufacture of glass substrates for generally known so-called 2.5 inch hard disk drives or 3.5 inch hard disk drives.

Specifically, the inventors found that it is difficult to sufficiently enhance the strength of small and thin glass substrates with a diameter of 50 mm or less and a thickness of less than 0.5 mm by known techniques, and that problems in magnetic disks, such as fractures, cannot be certainly prevented in some cases.

As a result of successive research, the inventors found that the above-describe problems can be overcome by appropriately controlling chemical strengthening conditions in the manufacture of the magnetic disk glass substrate.

While the impact resistance of the glass substrate may be enhanced depending on the conditions of the chemical strengthening treatment, the chemical strengthening treatment increases the waviness ("Wa" in abbreviated form) at the surfaces of the substrate. Consequently, the glide height of the magnetic disk using the glass substrate may be undesirably increased and the reduction of the flying height may be impaired.

In order to simultaneously overcome the two problems with the impact resistance of the glass substrate and the waviness (Wa) at the surface of the substrate, the inventors further advanced the research, and found that the two problems can be overcome at one time by appropriately setting chemical strengthening conditions to control the chemical strengthening treatment.

The present invention includes the following aspects.

(First Aspect)

A magnetic disk glass substrate according to the present invention has a disk thickness of less than 0.5 mm so as to be used in 1 inch hard disk drives or smaller hard disk drives using a smaller magnetic disk than that of the 1 inch hard disk drive. The glass substrate has a predetermined disk thickness and mirror-finished main surfaces with no cracks, by lapping the main surfaces. The glass substrate is subjected to chemical strengthening treatment to form compressive stress layers with thicknesses d1 and d2 at the main surfaces and a tensile stress layer with a thickness L between the compressive stress layers. The product L·Pt of the thickness L of the tensile stress layer and the maximum tensile stress Pt of the tensile stress layer is set at a predetermined value, so that the magnetic disk glass substrate has a predetermined impact resistance and a predetermined waviness (Wa) at the main surfaces. The thickness L is measured by observing longitudinal section of the magnetic disk glass substrate with a Babinet compensator.

For example, the predetermined impact resistance may be 3000 G or more, and the predetermined waviness (Wa) may be 1.0 nm or less.

(Second Aspect)

In the magnetic disk glass substrate of the first aspect of the present invention, the product L·Pt of the thickness L of the tensile stress layer and the tensile stress Pt of the tensile stress layer is in the range of 0.4 to 2.0 kg/mm.

Herein, the magnetic disk glass substrate satisfies the following relationship:

$$0.4 \text{ (kg/mm)} \leq L \cdot Pt \leq 2.0 \text{ (kg/mm)}$$

Although the thickness L of the tensile stress layer may be derived from the equation L={T−(d1+d2)} using the disk thickness T after the chemical strengthening treatment, the tensile stress layer thickness L is preferably directly measured.

(Third Aspect)

In the magnetic disk glass substrate of the first aspect of the present invention, the tensile stress layer thickness L is 0.4 mm or less, and the maximum tensile stress Pt of the tensile stress layer is 10 kg/mm² or less.

Herein, the magnetic disk glass substrate satisfies the following relationship:

$$L \leq 0.4 \text{ (mm)}$$

$$Pt \leq 10 \text{ (kg/mm}^2\text{)}$$

(Fourth Aspect)

In the magnetic disk glass substrate of the first aspect of the present invention, one of the compressive stress layers at the main surfaces has a thickness d1, the other compressive stress layer has a thickness d2, and the total thickness D of the thicknesses d1 and d2 is 40% or more of the disk thickness T.

Herein, the magnetic disk glass substrate satisfies the following relationship:

$$(D/T) \geq 0.4$$

(Fifth Aspect)

In the magnetic disk glass substrate of the fourth aspect of the present invention, the maximum tensile stress Pt of the tensile stress layer is 10 kg/mm² or less.

Herein, the magnetic disk glass substrate satisfies the following relationship:

$$Pt \leq 10 \text{ (kg/mm}^2\text{)}$$

(Sixth Aspect)

In the magnetic disk glass substrate of the first aspect of the present invention, the compressive stress layer has a maximum compressive stress Pc of 4 kg/mm² or more.

Herein, the magnetic disk glass substrate satisfies the following relationship:

$$Pc \geq 4 \text{ (kg/mm}^2\text{)}$$

(Seventh Aspect)

The magnetic disk glass substrate of the first aspect of the present invention is used for a magnetic disk installed in a hard disk drive that starts and stop operation by a load/unload system.

(Eighth Aspect)

A magnetic disk of the present invention includes the magnetic disk glass substrate according to the first aspect, and at least a magnetic layer is formed on the magnetic disk glass substrate.

(Ninth Aspect)

A method for manufacturing the magnetic disk glass substrate according to the present invention includes the chemical strengthening step of bringing a glass substrate into contact with a melted mixture of at least three alkali metal nitrates to perform low-temperature ion exchange, thereby forming the compressive stress layers at both main surfaces of the glass substrate and the tensile stress layer between the compressive stress layers.

(Tenth Aspect)

The method for manufacturing the magnetic disk glass substrate of the ninth aspect further includes the polishing step of relatively moving an abrasive cloth and the glass substrate while colloidal silica abrasive grain or diamond abrasive grain is fed, thereby removing cracks in the main surfaces of the glass substrate to form mirror-finished surfaces.

(Eleventh Aspect)

In the method for manufacturing the magnetic disk glass substrate of the tenth aspect, the mirror-finished surfaces formed in the polishing step has an arithmetic mean roughness (Ra) of 0.4 nm or less.

(Twelfth Aspect)

A method for manufacturing a magnetic disk includes the step of forming at least a magnetic layer on a main surface of the magnetic disk glass substrate manufactured by the method according to the ninth aspect.

EFFECT OF THE INVENTION

In a magnetic disk glass substrate having compressive stress layers respectively having thicknesses d1 and d2 formed at both main surfaces by chemical strengthening treatment and a tensile stress layer having a thickness L and a maximum tensile stress Pt, by setting the product L·Pt of the tensile stress layer thickness and the tensile stress at a predetermined value, the magnetic disk glass substrate can have a predetermined impact resistance, and a predetermined waviness (Wa) at the main surfaces.

The predetermined impact resistance and the predetermined waviness (Wa) at the main surfaces are such values (for example, an impact resistance of 3000 G or more; Wa of 1.0 nm or less) as do not cause problems when the magnetic disk glass substrate with a disk thickness of less than 0.5 mm is used in a 1 inch hard disk drive or a hard disk drive containing a smaller magnetic disk than that of the 1 inch hard disk drive.

When the product L·Pt of the tensile stress layer thickness and the maximum tensile stress is in the range of 0.4 to 2.0 kg/mm under the conditions where the tensile stress layer has a thickness L and a maximum tensile stress Pt, the magnetic disk glass substrate can have a favorable impact resistance, and a favorable waviness (Wa) at the surfaces.

By setting the thickness L of the tensile stress layer at 0.4 mm or less, or by setting the total thickness D of the thickness d1 of one compressive stress layer formed at one of the main surfaces and the thickness d2 of the other compressive stress layer at 40% or more relative to the disk thickness T, the magnetic disk glass substrate can have a favorable impact resistance.

By setting the maximum tensile stress Pt of the tensile stress layer at 10 kg/mm$^2$ or less, the magnetic disk glass substrate can have a favorable impact resistance and durability, and a favorable waviness (Wa) at the surfaces.

By setting the highest compressive stress Pc of the compressive stress layer at 4 kg/mm$^2$ or more, the magnetic disk glass substrate can have a favorable impact resistance.

Since the magnetic disk of the present invention includes the magnetic disk glass substrate and at least the magnetic layer on the glass substrate, it has a favorable impact resistance and durability. The magnetic disk can be installed in a hard disk drive that starts and stops operation by a load/unload system.

Accordingly, the present invention can be suitably applied to small hard disk drives that can be installed in highly mobile apparatuses, such as cellular phones, digital cameras, portable MP3 players, PDA's and other portable information apparatuses, and car navigation systems and vehicle-mounted apparatuses. A magnetic disk glass that is not broken even if an impact of 2000 G or more is applied can be used in the hard disk drives, and a magnetic disk using such a magnetic disk glass substrate can be achieved.

BEST MODE FOR CARRYING OUT THE INVENTION

Preferred embodiments of the present invention will now be described in detail with reference to the drawings.

In order to produce the magnetic disk glass substrate of the present invention, the main surfaces of a glass plate is lapped (ground) to prepare a glass base. The glass base is cut into a glass disk, and then the main surfaces of the glass disk are polished.

The glass plate to be lapped in the present invention may have a variety of shapes, and may have a rectangular shape or a disk shape. Disk-shaped glass plates can be lapped with a lapping machine conventionally used in the manufacture of magnetic disk glass substrates, and can be reliably processed at low cost.

The glass plate must be larger than the desired magnetic disk glass substrate. For example, a magnetic disk glass substrate used in a magnetic disk installed in a 1 inch hard disk drive or a smaller hard disk drive has a diameter of about 10 to 30 mm. Accordingly, the disk-shaped glass plate has a diameter of 30 mm or more, and preferably 48 mm or more. In particular, a disk-shaped glass plate with a diameter of 65 mm or more can be formed into a plurality of magnetic disk glass substrates intended for use in 1 inch hard disk drives, and is thus preferable in view of mass production. The upper limit in size of the glass plate is not particularly limited, but the disk-shaped glass plate preferably has a diameter of 100 mm or less.

The glass plate can be made of, for example, molten glass by a known process, such as pressing, floating, or fusion. Among these processes, pressing can provide the glass plate at low cost.

Any glass can be used for the glass plate as long as it can be chemically strengthened. Preferably, aluminosilicate glass is used. Lithium-containing aluminosilicate glass is particularly preferable. Aluminosilicate glass facilitates precise formation of compressive stress layers having an appropriate compressive stress and a tensile stress layer having an appropriate tensile stress by ion-exchange chemical strengthening treatment, particularly low-temperature ion-exchange chemical strengthening treatment.

Preferably, the aluminosilicate glass has a composition mainly containing 58% to 75% by weight of $SiO_2$, 5% to 23% by weight of $Al_2O_3$, 3% to 10% by weight of $Li_2O$, and 4% to 13% by weight of $Na_2O$.

More preferably, the aluminosilicate glass has a composition mainly containing 62% to 75% by weight of $SiO_2$, 5% to 15% by weight of $Al_2O_3$, 4% to 10% by weight of $Li_2O$, 4% to 12% by weight of $Na_2O$, and 5.5% to 15% by weight of $ZrO_2$, with a $Na_2O/ZrO_2$ weight ratio of 0.5 to 2.0 and a $Al_2O_3/ZrO_2$ weight ratio of 0.4 to 2.5.

In order to remove protrusions resulting from undissolved $ZrO_2$ at the surface of the glass disk, a glass suitable for chemical strengthening treatment is preferably used which contains 57% to 74% of $SiO_2$, 0 to 2.8% of $ZrO_2$, 3% to 15% of $Al_2O_3$, 7% to 16% of $Li_2O$, and 4% to 14% of $Na_2O$, on a molar basis.

Such aluminosilicate glass can be chemically strengthened to increase the flexural strength and Knoop hardness.

The lapping is intended to increase the profile precision (for example, flatness of the main surfaces) and dimensional precision (for example, precision in thickness) of the main surfaces of the workpiece or the glass plate. The lapping is performed by relatively moving the glass plate and a grinding stone or surface plate to grind the main surface of the glass plate, with the grinding stone or surface plate pressed against the surface of the glass plate. The lapping can be performed with a double side lapping machine using a planetary gear system.

For the lapping, the main surfaces of the glass plate are preferably fed with a grinding fluid to wash sludge (swarf) out of the ground surfaces, and besides to cool the ground surfaces. A slurry prepared by adding free abrasive grain to the grinding fluid may be fed to the main surfaces of the workpiece for the lapping.

The grinding stone used for the lapping may be a diamond grinding stone. Further, hard abrasive grain, such as that of alumina, zirconia, or silicon carbide, is preferably used as free abrasive grain.

The lapping improves the profile precision of the glass plate to planarize the main surfaces and reduces the thickness of the glass plate to prepare a glass base with a predetermined thickness.

In the present invention, the main surfaces of the glass base are planarized and the thickness is reduced, by the lapping. Thus, the glass disk can be cut out from the glass base. More specifically, the present invention can prevent defects, such as chipping, cracking, and fracturing, that may occur when the magnetic disk is cut out from the glass base.

For example, the flatness for a glass base with an area of 7088 mm$^2$ (area of a circle with a diameter of 95 mm) is preferably 30 μm or less, and more preferably 10 μm or less. The flatness mentioned herein refers to the largest value of the waves with wavelengths of, for example, 200 nm to 95 mm in the entire circle of the glass base with a diameter of 95 mm, measured with an apparatus OPTIFLAT (product name) manufactured by PHASE SHIFT TECHNOLOGY or its equivalent. Preferably, the thickness of the glass base is 2 mm or less, and more preferably 0.8 mm or less. A glass base with a thickness of less than 0.2 mm may not endure the load applied when the glass disk is cut out from the glass base. Therefore, the glass base preferably has a thickness of 0.2 mm or more. On the other hand, a glass base with a thickness of more than 2 mm may not be precisely cut because of its large thickness, and may cause a defect, such as chip, crack, or fracture, when the glass disk is cut out.

The glass base must be larger than the desired magnetic disk glass substrate. For example, for a magnetic disk used in a 1 inch or a smaller hard disk drive, a magnetic disk glass substrate with a diameter of about 10 to 30 mm is used. Accordingly, the glass base has a diameter of 30 mm or more, and preferably 48 mm or more. In particular, a glass base with a diameter of 65 mm or more can provide a plurality of magnetic disk glass substrates intended for use in 1 inch hard disk drives, and is thus preferable in view of mass production. The upper limit in size of the glass base is not particularly limited, but the disk-shaped glass base preferably has a diameter of 100 mm or less.

For cutting the glass base, a cutting blade or grinding stone made of harder material than glass can be used, such as a diamond cutter or a diamond drill. Alternatively, a laser cutter may be used to cut the glass base. However, small glass disks with diameters of 30 mm or less are often difficult to cut out with a laser cutter. In this case, such glass disks can be easily cut out with a cutting blade or grinding stone.

The glass disk used in the invention prepared from the glass base preferably has a diameter of 30 mm or less. In the present invention, the glass disk that has been subjected to the lapping is at least polished to mirror-finish the main surfaces of the glass disk.

The polishing removes cracks in the main surfaces of the glass disk, and the surface roughness of the main surfaces measured by atomic force microscopy (AFM) is reduced to 5 nm or less in terms of $R_{max}$, or 0.4 nm or less in terms of arithmetic mean roughness (Ra). The values of the surface roughness are calculated from the surface geometry measured by AFM in accordance with Japan Industrial Standard (JIS) B0601. The glass disk having the mirror-finished main surfaces can prevent problems resulting from a so-called head crash or thermal asperities even if the magnetic disk using the glass disk includes a magnetic head having a flying height of, for example, 10 nm. The mirror-polished main surfaces of the glass disk facilitate uniform chemical strengthening treatment even in microfabricated regions, and prevent microcracks and, thus, delayed fracture.

For the polishing, for example, a surface plate with an abrasive cloth (for example, polishing pad) is pressed against the main surface of the glass disk, and the glass disk and the surface plate are relatively moved while polishing liquid is being fed to the surface of the glass disk. The polishing liquid preferably contains abrasive grain. For example, colloidal silica grain can be used as the abrasive grain. Preferably, the abrasive grain has an average grain size of 10 to 200 nm.

Alternatively, a technique using an abrasive tape may be applied in which, for example, a tape-shaped abrasive cloth (for example, abrasive tape) is pressed against the main surface of the glass disk, and the glass disk and the abrasive cloth are relatively moved while polishing liquid is being fed to the main surface of the glass disk. The polishing liquid preferably contains abrasive grain. For example, diamond abrasive grain can be used as the abrasive grain. Preferably, the abrasive grain has an average grain size of 10 to 200 nm.

The abrasive surface of the polishing pad or abrasive tape used in the present invention is preferably formed of a resin, such as polyurethane or polyester. Preferably, the polishing pad has an abrasive surface formed of a resin foam (for example, polyurethane foam), and the abrasive tape has an abrasive surface formed of resin fiber (for example, polyester fiber).

In the present invention, preferably, the glass disk is subjected to lapping before polishing. This lapping is performed in the same manner as the lapping of the glass plate. By lapping the glass disk before polishing, mirror-finished main surfaces can be formed in a shorter time.

In the present embodiment, preferably, the periphery of the glass disk is mirror-polished. The periphery of the glass disk is coarse and in a cut state, and the periphery is polished into a mirror-finished surface. Thus, particulate matter is prevented, and failures resulting from thermal asperities can be appropriately prevented in the magnetic disk using the magnetic disk glass substrate. In addition, the mirror-polished surface can prevent delayed fracture resulting from microcracks. Preferably, the mirror-polished periphery has an arithmetic mean roughness (Ra) of 100 nm or less when measured by AFM.

In the present invention, chemical strengthening treatment is performed before and after the step of polishing the glass disk. The chemical strengthening treatment produces a high compressive stress at the surfaces of the magnetic disk glass substrate to increase the impact resistance. In particular, a glass disk made of aluminosilicate glass is chemically strengthened favorably.

Any known chemical strengthening technique can be applied to the chemical strengthening treatment without particular limitation. The glass disk is chemically strengthened by, for example, bringing the glass disk into contact with a heated chemical strengthening molten salt to perform ion exchange substituting the ions of the chemical strengthening salt for the ions at the surface of the glass disk.

Ion exchange may be performed by a known method, such as low-temperature ion exchange, high-temperature ion exchange, surface crystallization, or glass surface dealkalization. Preferably, a low-temperature ion exchange method is applied. The low-temperature ion exchange method is performed at a temperature of the annealing point or less of the glass.

In the low-temperature ion exchange, alkali metal ions in the glass are replaced with other alkali metal ions having a larger ion radius than the alkali metal ions in the glass at a temperature of the annealing point or less. Consequently, the volume of the ion-exchanging portion is increased to produce a compressive stress at the surfaces of the glass. Thus, the surfaces of the glass are strengthened.

In the chemical strengthening treatment, the molten salt is heated to a temperature of 280 to 660° C., particularly 300 to 400° C. in order to conduct appropriate ion exchange.

The time for which the glass disk is in contact with the molten salt is preferably several hours to tens of hours.

Preferably, the glass disk is preheated to a temperature of 100 to 300° C. before coming into contact with the molten salt. After the chemical strengthening treatment, the glass disk is cooled and cleaned, and thus, a final product (magnetic disk glass substrate) is completed.

The chemical strengthening bath for the chemical strengthening treatment can be made of any material without particular limitation as long as it has high corrosion resistance and does not produce dust. This is because the chemical strengthening salt or chemical strengthening molten salt has oxidizing properties, and because this treatment is performed at a high temperature. Use of highly corrosion-resistant material prevents damage and dust, and thus prevents failures resulting from thermal asperities and head crash. Accordingly, the chemical strengthening bath is preferably made of quartz. Stainless steel may be used, including corrosion-resistant martensitic stainless steel and austenitic stainless steel. Quartz is superior in corrosion resistance, but is expensive. An appropriate material may be selected in view of profitability.

The chemical strengthening salt used in the present invention preferably contains a nitrate of an alkali metal element, such as potassium nitrate, sodium nitrate, or lithium nitrate. If the nitrate contains lithium, the lithium content is preferably 10 to 3000 ppm (for a mixture of three types of nitrates: potassium nitrate, sodium nitrate, and lithium nitrate, the mixture contains 0.001% to 0.3% by volume of lithium nitrate). If the lithium ion content in the chemical strengthening molten salt is excessively high, ion exchange is inhibited. Consequently, it may become difficult to obtain desired tensile stress and compressive stress. By chemically strengthening glass, particularly lithium-containing aluminosilicate glass, with the chemical strengthening salt, the resulting magnetic disk glass substrate can have a desired stiffness and impact resistance, and desired waviness (Wa) at the surface of the substrate.

The thus produced magnetic disk glass substrate of the present invention is suitable for a thin magnetic disk with a disk thickness of less than 0.5 mm, particularly of 0.1 to 0.4 mm. Further, the magnetic disk glass substrate is suitable for a small magnetic disk with a diameter (outer diameter) of 30 mm or less. Such a thin or small magnetic click is installed in a 1 inch hard disk drive or a hard disk drive smaller than the 1 inch hard disk drive. Thus, the magnetic disk glass substrate is suitable for 1 inch hard disk drives and smaller hard disk drives than the 1 inch hard disk drives.

For the magnetic disk installed in the 1 inch hard disk drive, the magnetic disk glass substrate has a diameter of about 27.4 mm and a disk thickness of 0.381 mm. For the magnetic disk installed in the 0.85 inch hard disk drive, the magnetic disk glass substrate has a diameter of about 21.6 mm and a disk thickness of 0.381 mm.

A magnetic disk according to the present invention has a magnetic layer on the magnetic disk glass substrate. For example, the magnetic layer may be formed of cobalt (Co)-based ferromagnetic material. In particular, the magnetic layer is preferably made of cobalt-platinum (Co—Pt) or cobalt-chromium (Co—Cr) ferromagnetic material that can produce a high coercive force. The magnetic layer can be formed by DC magnetron sputtering.

An underlayer or the like may be formed between the glass substrate and the magnetic layer, if necessary. The underlayer can be formed of an Al—Ru alloy or a Cr-based alloy.

The magnetic layer may be covered with a protective layer for protecting the magnetic disk against the impact from the magnetic head. The protective layer is preferably formed of a hard hydrogenated carbon film.

In addition, a PFPE (perfluoro polyether) lubricating layer may be formed over the protective layer to alleviate the interference between the magnetic head and the magnetic disk. The lubricating layer can be formed by, for example, dipping.

EXAMPLES

The present invention will be further described in detail with reference to Examples. However, the invention is not limited to the form of the Examples.

Example 1

A method for manufacturing the magnetic disk glass substrate in the present Example includes the following steps (1) to (7):

(1) rough lapping step (rough grinding step);
(2) shaping step (peripheral lapping step);
(3) precision lapping step (precision grinding step);
(4) peripheral mirror-polishing step;
(5) first polishing step;
(6) second polishing step; and
(7) chemical strengthening step.

First, a disk-shaped amorphous aluminosilicate glass base was prepared. This aluminosilicate glass contained lithium. Specifically, the aluminosilicate glass had a composition of 63.6% by weight of $SiO_2$, 14.2% by weight of $Al_2O_3$, 10.4% by weight of $Na_2O$, 5.4% by weight of $Li_2O$, 6.0% by weight of $ZrO_2$, and 0.4% by weight of $Sb_2O_3$.

(1) Rough Lapping Step

A 0.6 mm thick glass sheet made from molten aluminosilicate glass was used as the glass base. The glass sheet was formed into a disk-shaped glass disk with a diameter of 28.7 mm and a thickness of 0.6 mm using a grinding stone.

The glass sheet is generally formed by a down draw process or a float process. The disk-shaped glass base may be prepared by direct press. Any aluminosilicate glass can be used as the material of the glass sheet, as long as containing 58% to 75% by weight of $SiO_2$, 5% to 23% by weight of $Al_2O_3$, 4% to 13% by weight of $Na_2O$, and 3% to 10% by weight of $Li_2O$.

Then, the glass disk was subjected to the lapping step in order to increase the dimensional precision and profile precision. The lapping step was performed using a double side lapping machine with abrasive grain of #400 in grain size.

Specifically, both surfaces of the glass disk housed in a carrier were lapped to a flatness of 0 to 2 μm and a surface roughness ($R_{max}$) of about 6 μm with alumina abrasive grain of #400 in grain size by rotating a sun gear and an internal gear at a load of about 100 kg. The flatness refers to the largest value of the waves with wavelengths of 200 nm to 28.7 mm and is measured with an apparatus OPTIFLAT (product name) manufactured by PHASE SHIFT TECHNOLOGY. The surface roughness ($R_{max}$) was measured with a surface roughness meter based on the tracer method.

(2) Shaping Step

Then, a hole was formed in the center of the glass disk using a cylindrical grinding stone, and the edge of the periphery of the glass disk was ground. Subsequently, the edges of the periphery and the inner wall of the glass disk were chamfered in a predetermined manner. The surface roughness of the edges at this point was about 4 μm in terms of $R_{max}$ measured by the tracer method.

(3) Precision Lapping Step

Then, the main surfaces of the glass disk were lapped to a disk thickness of 0.427 mm, a flatness of 0 to 2 μm, surface roughness $R_{max}$ of about 2 μm, and a surface roughness Ra of about 0.2 μm with abrasive grain of #1000 in grain size. The flatness refers to the largest value of the waves with wavelengths of 200 nm to 28.7 mm, and is measured with OPTIFLAT (product name) manufactured by PHASE SHIFT TECHNOLOGY. The surface roughness ($R_{max}$, Ra) was measured with a surface roughness meter based on the tracer method.

The precision lapping step can reduce fine roughness formed at the main surfaces in the foregoing rough lapping step and shaping step.

After the precision lapping step, the glass disk was subjected to ultrasonic cleaning in cleaning baths of a neutral detergent and water, in that order, to which ultrasonic waves were applied.

(4) Peripheral Mirror-Polishing Step

The edges of the peripheries (inner periphery and outer periphery) of the glass disk were polished to a surface roughness Ra of about 40 nm with a brush while the glass disk was rotated. The surface roughness (Ra) was measured by AFM.

After the peripheral mirror-polishing, the main surfaces of the glass disk were rinsed with water.

In the peripheral mirror-polishing step, glass disks are stacked and their edges are polished. In order to prevent surface flaws at the main surfaces of the glass disks, the peripheral mirror-polishing step is preferably performed before the below-described first polishing step, or before and after the second polishing step.

The edges of the glass disk were mirror-finished by the peripheral mirror-polishing step so as to prevent dust such as particulate matter from being generated. After the peripheral mirror-polishing step, the diameter of the glass disk was measured and the result was 27.4 mm.

(5) First Polishing Step

Then, the first polishing step was performed with a double side polishing machine to remove residual flaws and strain.

In the double side polishing machine, the glass disk held by a carrier was allowed to adhere between an upper and a lower surface plate to which polishing pads are bonded. The carrier was engaged in a sun gear and an internal gear with the glass disk pressed between the upper and lower surface plates. Then, the sun gear was rotated so that the glass disk rotates on its axis and around the internal gear between the surface plates, while a polishing liquid was fed between the abrasive surfaces of the polishing pads and the main surfaces of the glass disk. Thus, the main surfaces were polished at one time.

The same double side polishing machine was used in the following Examples. Specifically, the first polishing step was performed using polyurethane foam as the polishing pad, and a polishing liquid containing cerium oxide and RO water. After the first polishing step, the glass disk was cleaned using ultrasonic technique in cleaning baths of a neutral detergent, pure water (1), pure water (2), and IPA (isopropyl alcohol) in that order, followed by drying in an IPA vapor bath.

(6) Second Polishing Step

Then, the second polishing step was performed. In this step, the main surfaces were mirror-polished with a soft polishing pad (made of polyurethane foam) and the same double side polishing machine as used in the first polishing step.

The second polishing step is carried in order to remove cracks certainly and to obtain mirror-finish the main surfaces reduced the surface roughness Ra of the main surfaces to, for example, about 0.4 to 0.1 nm while maintaining the flat main surfaces formed by the first polishing step. In this case, the surface roughness Ra is measured by AFM.

More specifically, the second polishing step was performed at a load of 100 g/cm² for 5 minutes, using a polishing liquid containing colloidal silica grains (average grain size: 80 nm) and RO water.

After the second polishing step, the glass disk was cleaned using ultrasonic technique in cleaning baths of a neutral detergent, pure water (1), pure water (2), and IPA (isopropyl alcohol) in that order, followed by drying in an IPA vapor bath.

(7) Chemical Strengthening Step

After the cleaning, the glass disk was subjected to chemical strengthening treatment. The chemical strengthening treatment used a chemical strengthening molten salt prepared by mixing 59.9995% by volume of potassium nitrate, 39.9995% by volume of sodium nitrate, and 0.001% by volume of lithium nitrate. The lithium content measured with an ICP emission analyzer was 10 ppm.

The glass disk after cleaning and drying was subjected to chemical strengthening treatment by immersing the disk in the chemical strengthening solution heated to 340° C. for 2 hours. In order to chemically strengthen the entire surface of the resulting magnetic disk glass substrate during immersion, a plurality of magnetic disk glass substrates were housed in a holder with their peripheries held.

After the chemical strengthening treatment, the magnetic disk glass substrate was rapidly cooled in a water bath of 20° C. for about 10 minutes.

After cooling, the magnetic disk glass substrate was cleaned by immersing in concentrated sulfuric acid heated to about 40° C. Subsequently, the glass substrate was further cleaned using ultrasonic technique in cleaning baths of pure water (1), pure water (2), and IPA (isopropyl alcohol) in that order, followed by drying in an IPA vapor bath.

Then, the main surfaces of the magnetic disk glass substrate were subjected to visual inspection and subsequently thorough precise inspection by optical reflection, scattering, and transmission. As a result, protrusions resulting from trapped foreign matter or flaws were not found at the main surfaces of the magnetic disk glass substrate.

In addition, the surface roughness of the magnetic disk glass substrate was measured by AFM. As a result, it was confirmed that extremely smooth mirror-finished surfaces were formed with an $R_{max}$ of 2.5 nm and an Ra of 0.30 nm. The values representing the surface roughness were calculated in accordance with Japan Industrial Standard (JIS) B0601 from the surface geometry measured by AFM.

Further, the magnetic disk glass substrate had an inner diameter of 7 mm, an outer diameter of 27.4 mm, and a thickness of 0.381 mm. This means that the magnetic disk glass substrate has suitable dimensions for use in 1 inch magnetic disk.

In addition, the inner periphery defining the hole in the magnetic disk glass substrate had surface roughnesses of 40 nm in terms of Ra measured by AFM at the edge, and of 50 nm in terms of Ra at the inner wall. The external periphery had surface roughness of 40 nm in terms of Ra at the chamfered portion, and of 70 nm in terms of Ra at the external wall. Thus, it was confirmed that the internal periphery was mirror-finished as well as the external periphery.

The main surfaces of the resulting magnetic disk glass substrate were analyzed with an electron microscope. As a result, it was confirmed that the main surfaces had been mirror-finished with no cracks. By mirror-polishing the main surfaces with colloidal silica abrasive grain (average grain size: 80 nm), smooth mirror-finished surfaces with an Ra of 0.30 nm were formed.

The mirror-finished main surfaces with an Ra of about 0.1 to 0.4 nm and with no cracks certainly prevent delayed fracture in the chemically strengthened glass.

Furthermore, the resulting magnetic disk glass substrate did not have foreign matter or particulate matter that may cause thermal asperities on the surfaces, nor have foreign matter or cracks on the inner wall of the hole.

(Measurement of Stress Layers)

The magnetic disk glass substrate was cut into a rectangular piece with a width of about 3 mm so as to expose the cross-sections perpendicular to the main surfaces. Then, both cross-sections (sections of the substrate) of the rectangular piece were ground and polished with an abrasive and a polishing pad until the distance between the cross-sections was reduced to about 0.5 mm.

Figure 1:
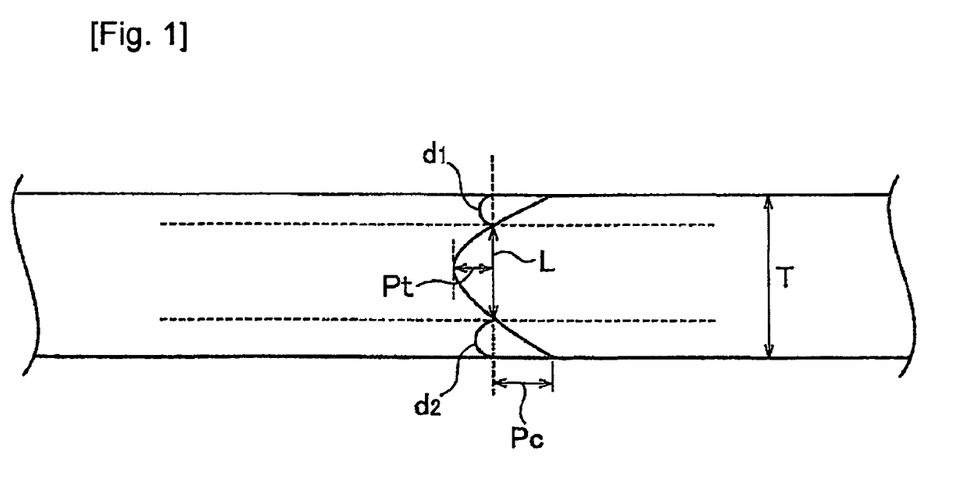
FIG. 1 is a sectional view showing the profile of stress layers at a section of a magnetic disk glass substrate according to the present invention.

FIG. 1 is a sectional view of the profile of the stress layers of the magnetic disk glass substrate.

The sectional profile of the stress layers as shown in FIG. 1 can be obtained by measuring the exposed section of the magnetic disk glass substrate with a Babinet compensator.

The Babinet compensator includes two opposing quartz wedges with the same angle. One of the wedges is shifted in the direction of its length by a screw of a micrometer. The two wedges are perpendicular to the optical axis, and the movable prism has an axis extending in the shifting direction. This instrument is widely used for inspections for the phase difference (retardation) and the degree of double refraction of crystals, checks on glass with internal stress, and the like.

The profile of the stress layers includes the following.

T: thickness (total) of magnetic disk glass substrate (mm)
$d_1$, $d_2$: thickness (depth) of compressive stress layers (stress layer depth) (mm)
D ($=d_1+d_2$): total thickness of compressive stress layers (mm)
L ($=T-(d_1+d_2)$): thickness of tensile stress layer (mm)
Pc: compressive stress (compression stress) (kg/mm$^2$)
Pt: tensile stress (kg/mm$^2$)

The magnetic disk glass substrate prepared in the present Example was Pt=3.62 (kg/mm$^2$), Pc=10.10 (kg/mm$^2$), D/2=0.089 (mm), D/T=0.47, L=0.203 (mm), and L·Pt=0.735 (kg/mm).

(Impact Resistance Test)

The magnetic disk glass substrate was subjected to Dana's impact test with AVEX-SM-110-MP manufactured by Arbrown. Specifically, impacts of pulsed sine half waves from 1000 G to 5000 G were applied to the magnetic disk glass substrate combined with a dedicated impact test jig in the direction perpendicular to the main surfaces, and the magnetic disk glass substrate was checked for fractures.

A small hard disk drive (HDD) containing a magnetic disk using a substrate with a diameter of 50 mm or less, or 30 mm or less, and a thickness of less than 0.5 mm, or 0.4 mm or less, requires product specifications ensuring that the hard disk drive (HDD) can endure an impact of 2000 G when it is subjected to drop test. However, the inventors found that in drop test performed on hard disk drives (HDD's) including magnetic disk glass substrates designed so as to be endurable to 2000 G in a solely subjected impact test, several percent of the substrates were fractured. On the other hand, substrates designed so as to be endurable to 3000 G were not fractured at all. As a consequence, in order to ensure that the completed hard disk drive (HDD) endures an impact of 2000 G, the substrate must be solely endurable to 3000 G. Accordingly, magnetic disk glass substrates solely endurable to 3000 G in impact test were determined to be acceptable.

The magnetic disk glass substrate prepared in the present Example was endurable to an impact of 3000 G in impact test.

(Measurement of Waviness (Wa))

The waviness (Wa) at the surface of magnetic disk glass substrate was measured. The waviness (Wa) of the substrate is a property of the surface geometry of the substrate, and is applied to waves with wavelengths on the order of millimeters and amplitudes on the order of nanometers. Waves with smaller wavelengths are represented by "roughness" while larger waves are represented by "flatness". The "roughness", "waviness", and "flatness" are each a property representing the surface geometry of the substrate, and are difficult to discriminate clearly from each other. The surface of the glass substrate in practice has unevenness with wavelengths and amplitudes on the order of angstroms (hereinafter referred to as "minimal unevenness") at random. The "roughness" expresses the state of the "minimal unevenness" on the order of micrometers. Although it seems that the roughness includes minimal unevenness at random, the state where the unevenness is present has a certain periodicity in a relatively long span. The periodicity of the "minimal unevenness" is the "waviness". Accordingly, it can be said that the "waviness" expresses the feature of the state where the unevenness is present.

In the present Example, the waviness (Wa) was measured with an optical measuring unit OPTIFLAT (product name) manufactured by PHASE SHIFT TECHNOLOGY. For a magnetic disk glass substrate with an outer diameter of 27.4 mm, inner diameter of 7 mm, and a thickness of 0.381 mm, the waviness (Wa) refers to the average of the waves with wavelengths of 200 nm to 5 mm at the entire surface of the substrate, that is, in an area surrounded by concentric circles with radius (r) of 3.5 mm and 13.7 mm from the center of the disk.

The waviness of the magnetic disk glass substrate prepared in the present Example was measured and the result was Wa=0.54 nm.

(Manufacture of Magnetic Disk)

The magnetic disk was manufactured through the following process.

An Al—Ru seed layer, a Cr—W underlayer, a Co—Cr—Pt—Ta magnetic layer, and a hydrogenated carbon protective layer were formed in that order on each main surface of the magnetic disk glass substrate prepared through the foregoing steps by the use of a statically opposed DC magnetron sputtering apparatus. The seed layer reduces the grain size of the magnetic grains of the magnetic layer, and the underlayer orients the easy magnetization axis of the magnetic layer in the in-plane direction.

The magnetic disk at least includes the magnetic disk glass substrate being a nonmagnetic substrate, the magnetic layer formed on the magnetic disk glass substrate, a protective layer formed on the magnetic layer, and a lubricating layer formed on the protective layer.

The nonmagnetic metal layers (nonmagnetic underlayers) comprising the seed layer and the underlayer are formed between the magnetic disk glass substrate and the magnetic layer. The layers of the magnetic disk other than the magnetic layer are made of nonmagnetic materials. In the present Example, the magnetic layer was in contact with the protective layer, and the protective layer was in contact with the lubricating layer.

Specifically, at first, the Al—Ru (aluminum-ruthenium) seed layer was deposited to a thickness of 30 nm on the magnetic disk glass substrate by sputtering with an Al—Ru alloy target (Al: 50 at %, Ru: 50 at %). Then, the Cr—W (chromium-tungsten) underlayer was deposited to a thickness of 20 nm on the seed layer 5 by sputtering with a Cr—W alloy target (Cr: 80 at %, W: 20 at %). Then, the Co—Cr—Pt—Ta (cobalt-chromium-platinum-tantalum) magnetic layer was deposited to a thickness of 15 nm on the underlayer by sputtering with a Co—Cr—Pt—Ta alloy target (Cr: 20 at %, pt: 12 at %, Ta: 5 at %, balance being Co).

Then, the magnetic layer was coated with the hydrogenated carbon protective layer, and further the PFPE (perfluoro polyether) lubricating layer was formed by dipping. The protective layer protects the magnetic layer against the impact from the magnetic head. Thus, the magnetic disk was obtained.

The resulting magnetic disk was subjected to a glide height test using a AE sensor. The glide height of the magnetic disk was 4.3 nm. Further, the magnetic disk was subjected to a glide test using a glide head at a flying height of 10 nm. No foreign matter coming into contact with the magnetic disk was found, and a stable floating state was maintained.

The magnetic disk was further subjected to record/reproduction test at 700 kFCI, and a sufficient signal-to-noise ratio (S/N ratio) was obtained with no error.

The magnetic disk was further driven in a 1 inch hard disk drive requiring an information recording density of at least 60 gigabits per square inch. The magnetic disk performed recording and reproduction successfully without problems. Specifically, no problems resulting from head crash or thermal asperities occurred.

Examples 2 to 12, Comparative Examples 1 to 10

A plurality of samples of the magnetic disk glass substrate were prepared under arbitrarily selected chemical strengthening conditions so as to vary the sectional profile of the stress layers and the waviness (Wa) of the main surfaces of the magnetic disk glass substrate. These samples were used for Examples 2 to 12 and Comparative Examples 1 to 10. The preparation conditions (chemical strengthening conditions) of these samples are shown in Table 1, including those of Example 1. The samples of the magnetic disk substrate of the Examples 2 to 12 and Comparative Examples 1 to 10 were prepared under the same conditions as in Example 1 except for the chemical strengthening conditions.

TABLE 1

Sample preparation conditions (chemical strengthening conditions)

| Example/Comparative Examples | Glass Substrate Diameter (mm) | Glass Substrate Thickness (mm) | Composition of Chemical Strengthening Salt Mixture | | | Treatment Temperature (° C.) | Treatment Time (hour) |
|---|---|---|---|---|---|---|---|
| | | | Potassium Content (vol %) | Sodium Content (vol %) | Lithium Content (vol %) | | |
| Example 1 | 27.4 | 0.381 | 59.9995 | 39.9995 | 0.001 | 340 | 2 |
| Example 2 | 27.4 | 0.381 | 59.9995 | 39.9995 | 0.001 | 340 | 4 |
| Example 3 | 27.4 | 0.381 | 59.9 | 39.9 | 0.2 | 340 | 4 |
| Example 4 | 27.4 | 0.381 | 59.9995 | 39.9995 | 0.001 | 380 | 2 |
| Example 5 | 27.4 | 0.381 | 59.9 | 39.9 | 0.2 | 380 | 2 |
| Example 6 | 27.4 | 0.381 | 59.9995 | 39.9995 | 0.001 | 380 | 4 |
| Example 7 | 27.4 | 0.381 | 59.9 | 39.9 | 0.2 | 380 | 4 |
| Example 8 | 27.4 | 0.381 | 89.9995 | 9.9995 | 0.001 | 420 | 4 |
| Example 9 | 27.4 | 0.381 | 95.7 | 4 | 0.3 | 420 | 6 |
| Example 10 | 27.4 | 0.381 | 59.7 | 39 | 0.3 | 420 | 6 |
| Example 11 | 27.4 | 0.381 | 20.2 | 79.5 | 0.3 | 380 | 4 |
| Example 12 | 27.4 | 0.381 | 49.9995 | 49.9995 | 0.001 | 400 | 3 |
| Comparative Example 1 | 27.4 | 0.381 | 59.8 | 39.8 | 0.4 | 340 | 2 |
| Comparative Example 2 | 27.4 | 0.381 | 59.8 | 39.8 | 0.4 | 450 | 4 |
| Comparative Example 3 | 27.4 | 0.381 | No chemical strengthening treatment | | | | |
| Comparative Example 4 | 27.4 | 0.381 | 1 | 99 | 0 | 380 | 4 |
| Comparative Example 5 | 27.4 | 0.381 | 90 | 7 | 3 | 420 | 2 |
| Comparative Example 6 | 27.4 | 0.381 | 80 | 20 | 0 | 360 | 4 |
| Comparative Example 7 | 27.4 | 0.381 | 75 | 24 | 1 | 380 | 4 |
| Comparative Example 8 | 27.4 | 0.381 | 70 | 30 | 0 | 450 | 4 |

TABLE 1-continued

Sample preparation conditions (chemical strengthening conditions)

| Example/ Comparative Examples | Glass Substrate Diameter (mm) | Glass Substrate Thickness (mm) | Composition of Chemical Strengthening Salt Mixture | | | Treatment Temperature (°C.) | Treatment Time (hour) |
|---|---|---|---|---|---|---|---|
| | | | Potassium Content (vol %) | Sodium Content (vol %) | Lithium Content (vol %) | | |
| Comparative Example 9 | 27.4 | 0.381 | 70 | 29 | 1 | 380 | 4 |
| Comparative Example 10 | 27.4 | 0.381 | 7 | 90 | 3 | 340 | 2 |

Pt, Pc, D/2, D/T, L, and L·Pt of the magnetic disk glass substrates in Examples 2 to 12 and Comparative Examples 1 to 10 were obtained from their respective profiles at the sections of the stress layers, in the same manner as in Example 1. Further, the impact test (3000 G) and the measurement for waviness (Wa) at the main surfaces were performed on the glass substrates in the same manner as in Example 1. The results are shown in Table 2, including those of Example 1.

been found that the samples having an L·Pt value of more than 2.0 (kg/mm) have a waviness (Wa) of more than 1.0 nm at the main surfaces.

Figure 2:
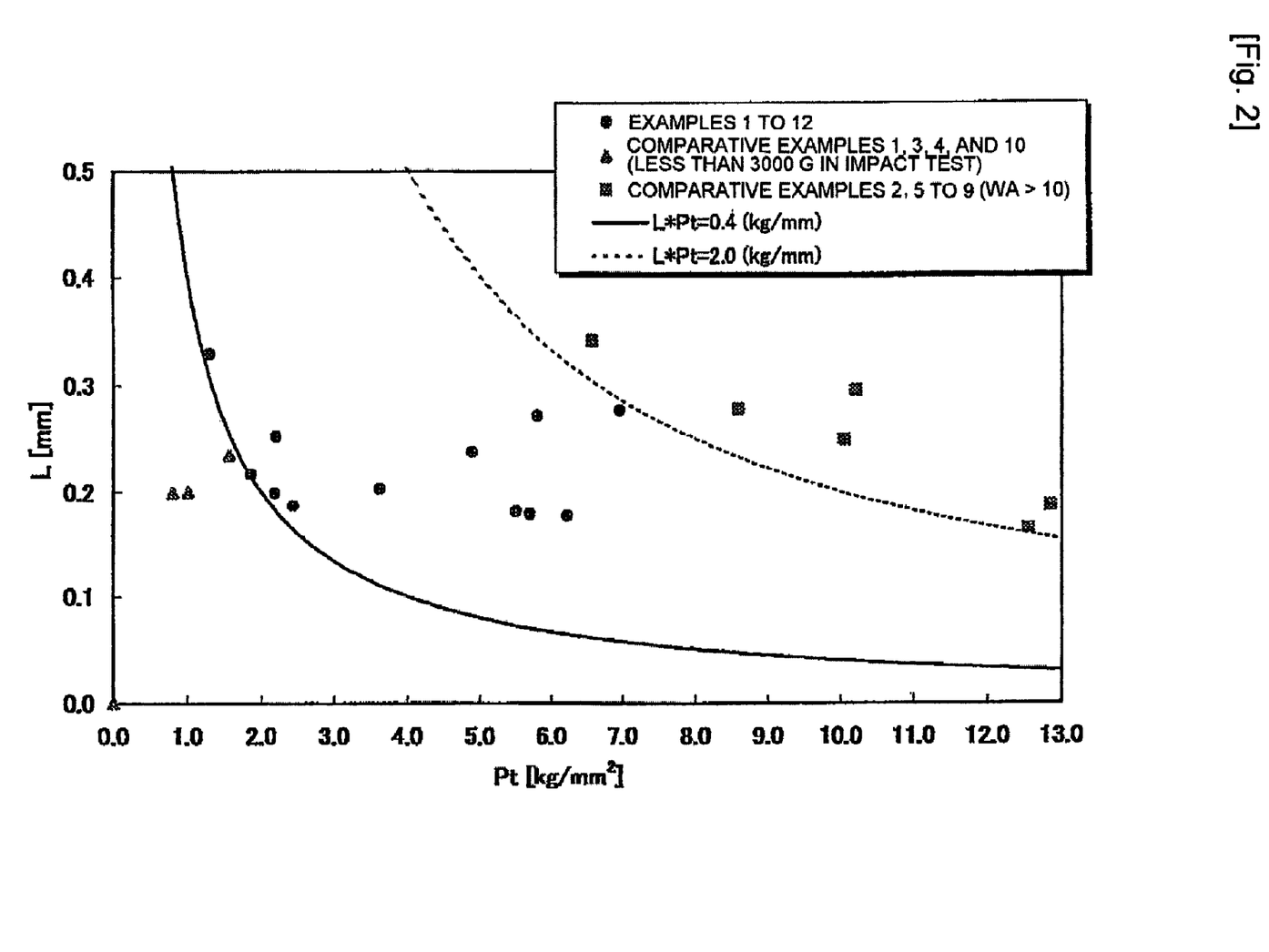
FIG. 2 is a plot of the relationship between the maximum tensile stress Pt of the tensile stress layer and the thickness L of the tensile stress layer of magnetic disk glass substrates subjected to chemical strengthening treatment under various conditions.

FIG. 2 is a plot of the results of Pt and L measurements of each magnetic disk glass substrate shown in Table 2. In the figure, black circles represent the results on the magnetic disk glass substrates in Examples 1 to 12, black triangles represent

TABLE 2

Measured values of Pt, Pc, D/2, D/T, L, and L · Pt of the stress layer profiles at the sections of the magnetic disk glass substrates, results of impact test on the glass substrates at 3000 G, and measured values of the waviness (Wa) of the main surface of the glass substrate

| Example/ Comparative Examples | Pt (kg/mm²) | Pc (kg/mm²) | D/2 (mm) | D/T | L (mm) | L * Pt (kg/mm) | Glass Substrate Impact Test at 3000 G | Main Surface Waviness (Wa) (nm) |
|---|---|---|---|---|---|---|---|---|
| Example 1 | 3.62 | 10.10 | 0.089 | 0.47 | 0.203 | 0.735 | OK | 0.54 |
| Example 2 | 5.50 | 11.08 | 0.100 | 0.52 | 0.181 | 0.996 | OK | 0.58 |
| Example 3 | 1.86 | 5.32 | 0.082 | 0.43 | 0.217 | 0.404 | OK | 0.51 |
| Example 4 | 5.70 | 11.89 | 0.101 | 0.53 | 0.179 | 1.020 | OK | 0.55 |
| Example 5 | 2.18 | 4.97 | 0.091 | 0.48 | 0.199 | 0.434 | OK | 0.53 |
| Example 6 | 6.22 | 13.71 | 0.102 | 0.54 | 0.177 | 1.101 | OK | 0.54 |
| Example 7 | 2.44 | 5.57 | 0.097 | 0.51 | 0.187 | 0.456 | OK | 0.51 |
| Example 8 | 6.95 | 7.58 | 0.127 | 0.67 | 0.277 | 1.925 | OK | 1.00 |
| Example 9 | 4.88 | 5.78 | 0.150 | 0.79 | 0.238 | 1.161 | OK | 0.90 |
| Example 10 | 5.80 | 5.58 | 0.152 | 0.80 | 0.272 | 1.578 | OK | 0.95 |
| Example 11 | 2.20 | 4.31 | 0.125 | 0.66 | 0.253 | 0.557 | OK | 0.51 |
| Example 12 | 1.30 | 4.56 | 0.121 | 0.64 | 0.33 | 0.429 | OK | 0.55 |
| Comparative Example 1 | 1.57 | 4.65 | 0.073 | 0.38 | 0.235 | 0.369 | NG | 0.45 |
| Comparative Example 2 | 12.55 | 23.32 | 0.108 | 0.57 | 0.165 | 2.071 | OK | 1.05 |
| Comparative Example 3 | 0 | 0 | 0 | 0 | 0 | 0 | NG | 0.43 |
| Comparative Example 4 | 1.01 | 1.10 | 0.073 | 0.38 | 0.201 | 0.203 | NG | 0.44 |
| Comparative Example 5 | 6.57 | 3.01 | 0.078 | 0.41 | 0.342 | 2.247 | OK | 1.15 |
| Comparative Example 6 | 10.21 | 9.85 | 0.154 | 0.81 | 0.296 | 3.022 | OK | 1.32 |
| Comparative Example 7 | 12.85 | 12.54 | 0.155 | 0.81 | 0.187 | 2.403 | OK | 1.07 |
| Comparative Example 8 | 8.59 | 11.30 | 0.118 | 0.62 | 0.278 | 2.388 | OK | 1.08 |
| Comparative Example 9 | 10.05 | 25.20 | 0.167 | 0.88 | 0.249 | 2.502 | OK | 1.23 |
| Comparative Example 10 | 0.80 | 1.10 | 0.011 | 0.06 | 0.2 | 0.160 | NG | 0.44 |

The results shown in Table 2 suggest that if $\{T-(d1+d2)\} \cdot Pt$, that is, L·Pt, is less than 0.4 (kg/mm), the glass substrate cannot solely endure an impact of 3000 G. It has also the results on the magnetic disk glass substrates in comparative examples that cannot endure an impact of 3000 G, and black squares represent the results on the magnetic disk glass substrates in comparative examples that have a waviness (Wa) of more than 1.0 nm at the main surfaces. The curved solid line represents L·Pt=0.4 (kg/mm), and the curved dotted line represents L·Pt=2.0 (kg/mm).

The magnetic disk prepared in Examples 2 to 12 and Comparative Examples 1 to 10 were subjected to glide height test with an AE sensor, and glide tests using a glide head with a flying height of 10 nm in the same manner as in Example 1. Table 3 shows measured waviness (Wa) at the main surfaces of each magnetic disk glass substrate prepared in Examples 2 to 12 and Comparative Examples 1 to 10 and the results of the glide height and glide test in Examples 2 to 12 and Comparative Examples 1 to 10, including the results in Example 1.

TABLE 3

Measured waviness (Wa) at the main surfaces of magnetic disk glass substrates, and results of glide height and glide test on magnetic disks using the substrates

| Example/Comparative Examples | Waviness (Wa) at Main Surfaces of Glass Substrate (nm) | Glide Height (nm) | Glide Test (Head Flying Height: 10 nm) |
|---|---|---|---|
| Example 1 | 0.54 | 4.3 | OK |
| Example 2 | 0.58 | 4.3 | OK |
| Example 3 | 0.51 | 4.5 | OK |
| Example 4 | 0.55 | 5.1 | OK |
| Example 5 | 0.53 | 4.8 | OK |
| Example 6 | 0.54 | 6.0 | OK |
| Example 7 | 0.51 | 4.0 | OK |
| Example 8 | 1.00 | 9.5 | OK |
| Example 9 | 0.90 | 6.5 | OK |
| Example 10 | 0.95 | 6.8 | OK |
| Example 11 | 0.51 | 5.3 | OK |
| Example 12 | 0.55 | 4.2 | OK |
| Comparative Example 1 | 0.45 | 4.2 | OK |
| Comparative Example 2 | 1.05 | 10.2 | NG |
| Comparative Example 3 | 0.43 | 3.8 | OK |
| Comparative Example 4 | 0.44 | 4.3 | OK |
| Comparative Example 5 | 1.15 | 11.3 | NG |
| Comparative Example 6 | 1.32 | 15.3 | NG |
| Comparative Example 7 | 1.07 | 10.3 | NG |
| Comparative Example 8 | 1.08 | 10.3 | NG |
| Comparative Example 9 | 1.23 | 11.3 | NG |
| Comparative Example 10 | 0.44 | 3.9 | OK |

Figure 3:
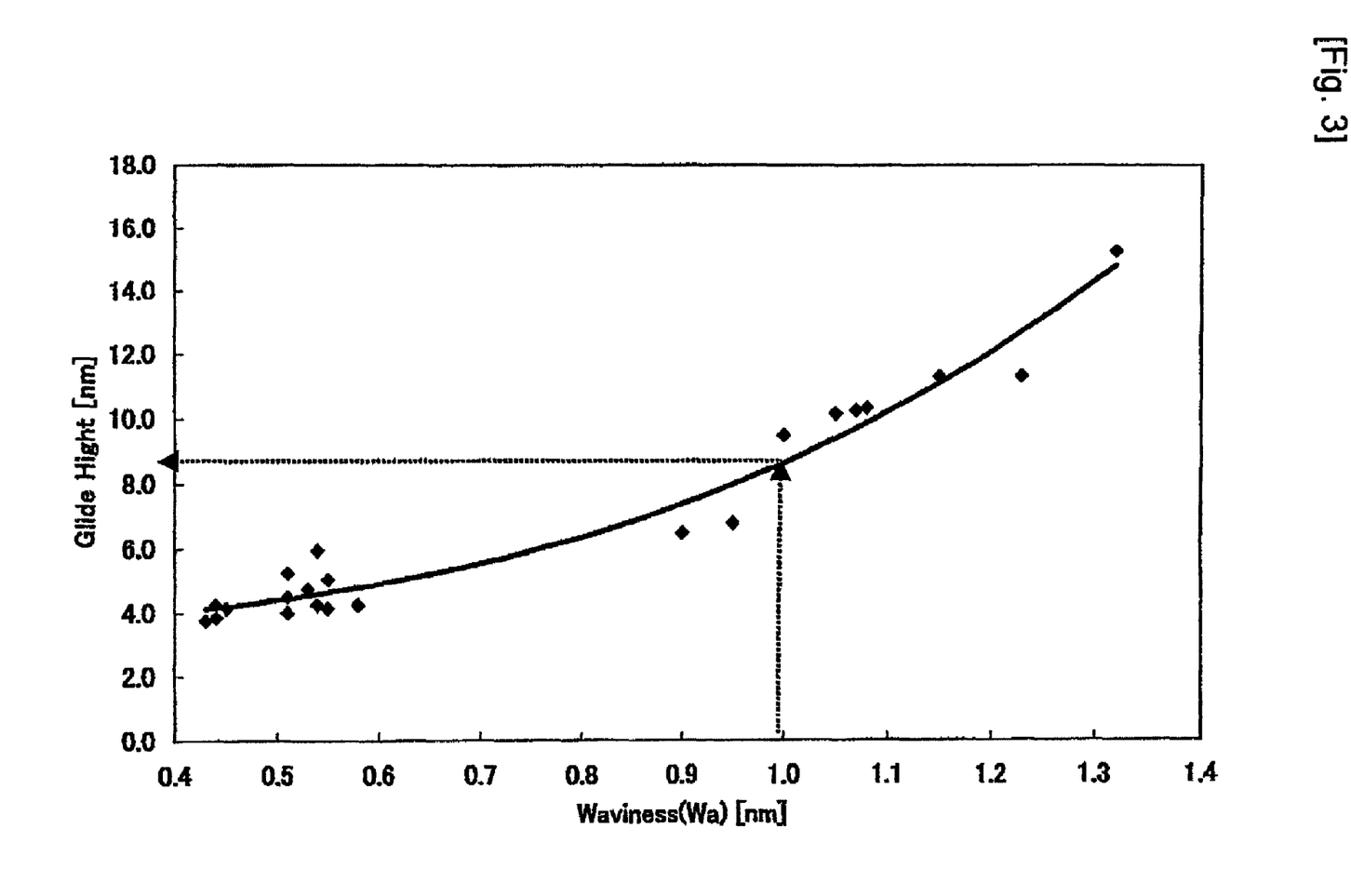
FIG. 3 is a plot of the relationship between the waviness (Wa) at the surfaces of glass substrates subjected to chemical strengthening treatment under various conditions and the glide height of magnetic disks using the glass substrates.

FIG. 3 is a plot of the waviness (Wa) at the main surfaces of each magnetic disk glass substrate shown in Table 3 and the glide height of the magnetic disk using the magnetic disk glass substrate. FIG. 3 shows that the magnetic disk glass substrate having a waviness (Wa) of 1.0 nm or less at the main surfaces allows the magnetic disk to have a glide height of less than 10 nm.

Therefore, in order to achieve a magnetic disk glass substrate endurable to an impact of 3000 G and having a waviness (Wa) of 1.0 nm or less at the main surfaces, and to allow the magnetic disk to have a glide height of less than 10 nm, the following relationship must be satisfied:

$$0.4 \text{ (kg/mm)} \leq L \cdot Pt \leq 2.0 \text{ (kg/mm)}$$

If the compressive stress layers of the magnetic disk glass substrate have insufficient thicknesses d1 and d2, the impact resistance is reduced. Accordingly, the following relationship must be satisfied:

$$L \leq 0.4 \text{ (mm) (where } L<T)$$

From the viewpoint of ensuring compressive stress layers with sufficient thicknesses d1 and d2, the following relationship may hold:

$$(D/T) \geq 0.4$$

Compressive stress layers with excessively large thicknesses d1 and d2 may increase the tensile stress excessively in the tensile stress layer to induce delayed fracture. Therefore, the following relationship is preferably satisfied from a practical viewpoint:

$$(D/T) \leq 0.8$$

Compressive stress layers of the magnetic disk glass substrate having an insufficient compressive stress Pc reduce the impact resistance. Therefore, the following relationship must be satisfied.

$$Pc \geq 4 \text{ (kg/mm}^2)$$

In order to prevent the increase in waviness (Wa) at the main surfaces of the substrate, and delayed fracture in the substrate, the tensile stress Pt of the tensile stress layer may satisfy the following relationship:

$$Pt \leq 10 \text{ (kg/mm}^2)$$

For a margin of impact resistance, magnetic disk glass substrates were prepared under arbitrarily selected chemical strengthening conditions in the same manner as above and were subjected to impact resistance test at 4000 G. As a result, it was found that magnetic disk glass substrates having a L·Pt value of 0.5 or more are endurable to an impact of 4000 G.

Each magnetic disk produced in Examples 2 to 12 was subjected to record/reproduction test at 700 kFCI in the same manner as in Example 1, and a sufficient signal-to-noise ratio (S/N ratio) was obtained with no error. Furthermore, the magnetic disk was driven in a 1 inch hard disk drive requiring an information recording density of at least 60 gigabits per square inch in the same manner as in Example 1. The magnetic disk performed recording and reproduction successfully without problems. Specifically, no problems resulting from head crash or thermal asperities occurred.

Moreover, each magnetic disk produced in Comparative Examples 1 to 10 was subjected to record/reproduction test at 700 kFCI in the same manner as in Example 1. The magnetic disks produced in Comparative Examples 1, 3, 4, and 10 exhibited sufficient signal-to-noise ratio (S/N ratio) with no error, but the magnetic disks produced in the other Comparative Examples did not exhibit sufficient signal-to-noise ratio (S/N ratio) and produced an error due to unfavorable flying characteristics of the head.

Furthermore, the magnetic disk was driven in a 1 inch hard disk drive requiring an information recording density of at least 60 gigabits per square inch in the same manner as in Example 1. The magnetic disks produced in Comparative Examples 1, 3, 4, and 10 performed recording and reproduction successfully without problems, but the magnetic disks produced in the other Comparative Example did not appropriately perform recording and reproduction, and caused failures resulting from head crash or thermal asperities.

The present invention does not limit the diameter (size) of the magnetic disk glass substrate. However, the invention is advantageous particularly in the manufacture of magnetic disk glass substrates with small diameters. The magnetic disk glass substrate with small diameter mentioned herein is used for magnetic disks with, for example, a diameter of 30 mm or less.

The small magnetic disk with a diameter of, for example, 30 mm or less is used for a storage of vehicle-mounted apparatuses such as car navigation systems or portable apparatuses such as PDA's and mobile phone units, and accordingly requires higher durability and impact resistance than general magnetic disks used for fixed apparatuses.

INDUSTRIAL APPLICABILITY

The magnetic disk glass substrate according to the present invention is used in a hard disk drive for a storage of vehicle-mounted apparatuses such as car navigation systems or portable apparatuses such as PDA's and mobile phone units.

The invention claimed is:

1. A method for manufacturing a magnetic disk glass substrate for use in a hard disk drive, the glass substrate comprising:
    compressive stress layers formed at the main surfaces; and
    a tensile stress layer formed between the compressive stress layers,
    the method comprising the steps of:
    chemically strengthening the glass substrate;
    bringing the glass substrate into contact with a melted mixture of at least three alkali metal nitrates in the chemical strengthening step;
    forming the compressive stress layers at both main surfaces of the glass substrate by an ion exchange; and
    forming the tensile stress layer between the compressive stress layers,
    wherein the melted mixture of at least three alkali metal nitrates contains 0.001% to 0.3% by volume of a nitrate of alkali metal having a smallest ion radius among the alkali metal nitrates,
    wherein the magnetic disk glass substrate has a disk thickness of less than 0.5 mm and mirror-finished main surfaces,
    wherein a product of a thickness of the tensile stress layer and a maximum tensile stress of the tensile stress layer is set at a predetermined value, so that the magnetic disk glass substrate has a impact resistance of 3000 G or more and the main surface of the magnetic disk glass substrate has a waviness (Wa) of 1.0 nm or less, and
    wherein the thickness of the tensile stress layer is measured by observing a longitudinal section of the magnetic disk glass substrate with a Babinet compensator.

2. The method for manufacturing the magnetic disk glass substrate according to claim 1, further comprising the step:
    polishing the glass substrate;
    wherein in the glass substrate polishing step, an abrasive cloth and the glass substrate is relatively moved while colloidal silica abrasive grain or diamond abrasive grain is fed, thereby removing cracks in the main surfaces of the glass substrate to form mirror-finished surfaces.

3. The method for manufacturing the magnetic disk glass substrate, according to claim 2, wherein:
    the mirror-finished surfaces have an arithmetic mean roughness (Ra) of 0.4 nm or less in the glass substrate polishing step.

4. A method for manufacturing a magnetic disk, comprising the step:
    forming at least a magnetic layer on a compressive stress layer formed on at least one main surface of the magnetic disk glass substrate manufactured by the method according to claim 1.

5. The method for manufacturing the magnetic disk glass substrate according to claim 1, wherein the three alkali metal nitrates comprises potassium nitrate, sodium nitrate and lithium nitrate, and
    the nitrate of the alkali metal having the smallest ion radius is the lithium nitrate.

6. The method for manufacturing the magnetic disk glass substrate according to claim 5, wherein a content of the lithium is 10 to 3000 ppm.

7. The method for manufacturing the magnetic disk glass substrate according to claim 6, wherein the glass substrate is aluminosilicate glass containing lithium.

* * * * *